United States Patent
Mori (10) Patent No.: US 9,996,219 B2
(45) Date of Patent: Jun. 12, 2018

(54) DISPLAY CONTROL APPARATUS, METHOD AND PROGRAM, AND STORAGE MEDIUM STORING PROGRAM

(71) Applicant: CANON KABUSHIKI KAISHA, Tokyo (JP)

(72) Inventor: Naomi Mori, Kawasaki (JP)

(73) Assignee: Canon Kabushiki Ksiaha, Tokyo (JP)

( * ) Notice: Subject to any disclaimer, the term of this patent is extended or adjusted under 35 U.S.C. 154(b) by 304 days.

(21) Appl. No.: 14/291,402

(22) Filed: May 30, 2014

(65) Prior Publication Data

US 2014/0365973 A1    Dec. 11, 2014

(30) Foreign Application Priority Data

Jun. 7, 2013    (JP) ................................. 2013-121306

(51) Int. Cl.
*G06F 3/048* (2013.01)
*G06F 3/0482* (2013.01)
*G06F 3/01* (2006.01)

(52) U.S. Cl.
CPC .................................. *G06F 3/0482* (2013.01)

(58) Field of Classification Search
CPC .. G06F 3/0362; G06F 3/0482; G06F 3/04842; G06F 3/0485; G06F 3/0489
See application file for complete search history.

(56) References Cited

U.S. PATENT DOCUMENTS

| 2005/0177794 A1 | 8/2005 | Kameyama et al. ......... 715/748 |
| 2012/0124615 A1* | 5/2012 | Lee .................. H04N 21/25875 |
| | | 725/30 |

FOREIGN PATENT DOCUMENTS

| JP | 07049764 A | 2/1995 |
| JP | 2005-223710 A | 8/2005 |

\* cited by examiner

*Primary Examiner* — Nicholas Augustine
(74) *Attorney, Agent, or Firm* — Fitzpatrick, Cella, Harper & Scinto (57) ABSTRACT

A system control unit displays, on a display unit, a menu screen corresponding to an operation mode designated through a mode change-over switch, and sets various conditions for the operation mode according to operation on an operation unit. The system control unit displays a predetermined menu item in a selected state on an initially opened menu screen. When a menu screen subjected to setting change is opened, the system control unit displays a menu item subjected to setting change last time in the selected state. A table indicating a menu item to be displayed in the selected state is stored in a nonvolatile memory.

12 Claims, 7 Drawing Sheets

|  |  | TAB 1 | TAB 2 | TAB 3 | TAB 4 | TAB 5 | ---- |
|---|---|---|---|---|---|---|---|
| PHOTOGRAPHING MODE | APPLIED | 1 | 2 | 3 | 4 | 5 | ---- |
|  | SIMPLE | 1 | 2 | – | – | 3 | ---- |

FIG. 4B

| ITEM NO. | ITEM NAME |
|---|---|
| ⋮ | ⋮ |
| ITEM 10 | AF OPERATION |
| ITEM 11 | AF METHOD |
| ITEM 12 | CONTINUOUS AF |
| ITEM 13 | LENS OPTICAL CORRECTION |
| ⋮ | ⋮ |

FIG. 4C

| TAB NAME | ITEM NO. | ARRANGEMENT LINE IN APPLIED PHOTOGRAPHING | ARRANGEMENT LINE IN SIMPLE PHOTOGRAPHING |
|---|---|---|---|
| ⋮ | ⋮ | ⋮ | ⋮ |
| TAB 2 | ITEM 10 | 1 | 0 |
|  | ITEM 11 | 2 | 1 |
|  | ITEM 12 | 3 | 2 |
|  | ITEM 13 | 4 | 3 |
| TAB 3 | ITEM 14 | 1 | 0 |
| ⋮ | ⋮ | ⋮ | ⋮ |

FIG. 5A

| | TAB 1 | TAB 2 | TAB 3 | TAB 4 | TAB 5 | ------ |
|---|---|---|---|---|---|---|
| INITIAL FOCUS ITEM | ITEM 1 | DEFAULT | ITEM 19 | ITEM 25 | ITEM 30 | ------ |

FIG. 5B

| | TAB 1 | TAB 2 | TAB 3 | TAB 4 | TAB 5 | ------ |
|---|---|---|---|---|---|---|
| INITIAL FOCUS ITEM | ITEM 1 | ITEM 11 | ITEM 19 | ITEM 25 | ITEM 30 | ------ |

DISPLAY CONTROL APPARATUS, METHOD AND PROGRAM, AND STORAGE MEDIUM STORING PROGRAM

BACKGROUND OF THE INVENTION

Field of the Invention

The present invention relates to a display control apparatus, a method and a program and a storage medium storing the program that display items in a list form in various setting menus or the like and are capable of selecting any of displayed items.

Description of the Related Art

A display method of initially setting any one of a plurality of choices in a case where the plurality of choices are displayed in the list form, has been known. For instance, a method where a prescribed item, e.g., the top item, is always in a selected state during displaying of a menu, has been known. A method of displaying an item which was selected last time, in a selected state at displaying next time, has also been known (Japanese Patent Application Laid-Open No. 2005-223710 (Patent Document 1)). The former method has an advantage of facilitating recognition of a selected state through always selecting a certain item in a selected state during displaying of the menu. The latter method has an advantage of eliminating efforts to set a specific item to a selected state; this is based on the fact that, if the specific item is often selected, the probability that such an item is in a selected state is high.

There is a menu configuration where a part of a plurality of menu items varies according to the operation mode. For instance, this is a case where an item displayed in a certain operation mode is not displayed in another operation mode.

With such a menu configuration, adoption of a display method of displaying a menu item which was selected last time in a selected state may cause the following problems. For instance, in a case where a menu for a first operation mode is switched to a menu for a second operation mode, it is provided that an item A selected in the menu for the first operation mode does not exist in the menu for the second operation mode. In this case, an item B is in a selected state in the menu for the second operation mode differently from the case of the first operation mode. After this state is then returned to the menu for the first operation mode, if the item B selected in the second operation mode exists in the first operation mode, the menu for the first operation mode is displayed in a state where the item B is selected. That is, although a user has not performed an operation of changing the selected item, the item in the selected state in the menu for the first operation mode is changed from the item A to the item B. This change causes the user to feel uncomfortable.

It is an aspect of the invention to solve such inconvenience and provide a display control apparatus, a method and a program, and a storage medium that maintain an item selected last time even after transition between menus including partially different menu items.

SUMMARY OF THE INVENTION

A display control apparatus according to the present invention includes: a setting unit configured to set one of a plurality of operation modes; a display control unit configured to display menus which are different in at least a portion of menu items, in accordance with the operation mode set by the setting unit; and a control unit configured to, in a case where a menu displayed in a first operation mode set by the setting unit is changed to a menu to be displayed in a second operation mode set by the setting unit and in a case where the menu displayed by the display control unit is already subjected to change operation of a menu item to be selected, select and display a menu item corresponding to the menu item selected in the first operation mode, in the menu to be displayed in the second operation mode, and, in a case where the menu displayed by the display control unit is not subjected to change operation of a menu item to be selected, perform control so as to select and display a menu item at a predetermined position in the menu to be displayed, in the second operation mode irrespective of the menu item selected in the first operation mode.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Preferred embodiments of the present invention will now be described in detail in accordance with the accompanying drawings.

Various exemplary embodiments, features, and aspects of the present invention will be described in detail below with reference to the drawings.

Figure 1:
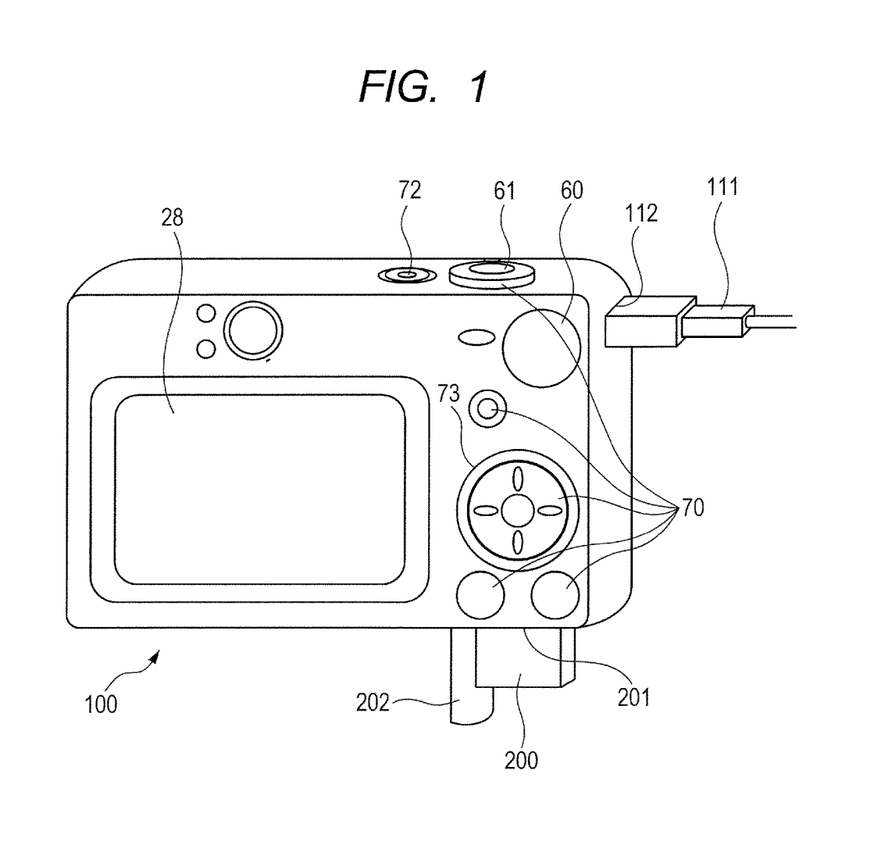
FIG. 1 is a diagram illustrating an appearance of an embodiment of the present invention.
Figure 2:
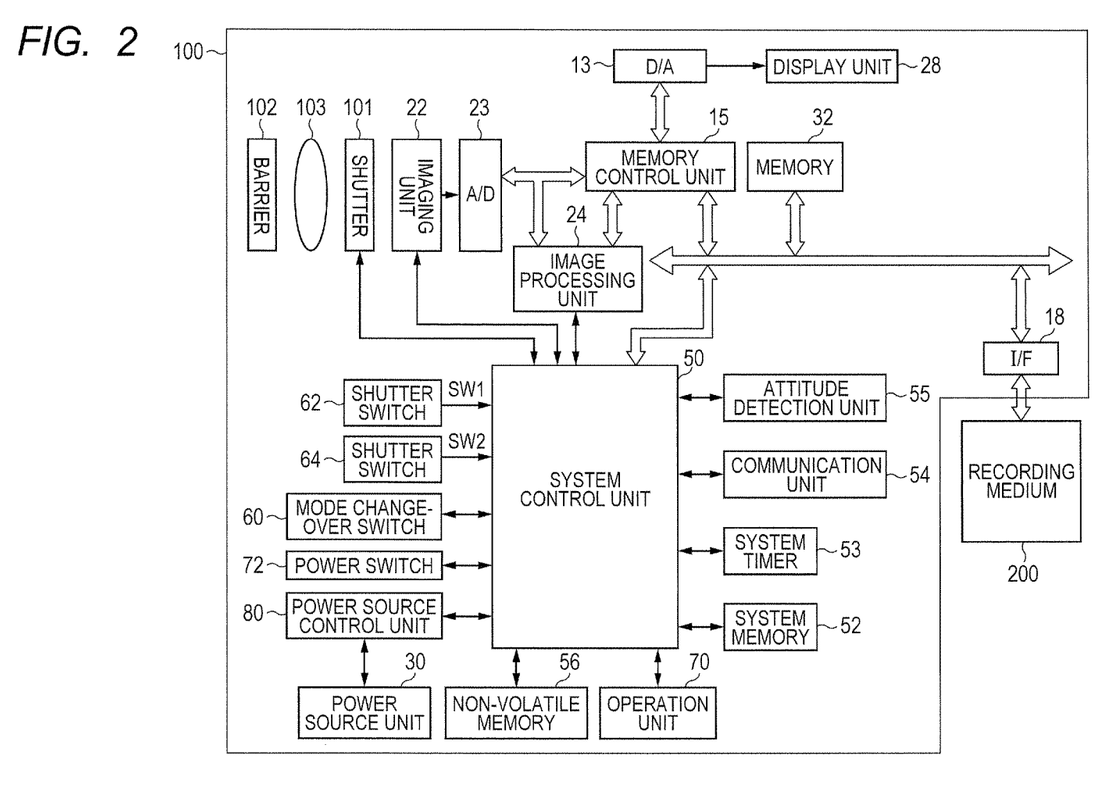
FIG. 2 is a schematic configurational block diagram of this embodiment.

FIG. 1 is a diagram of an appearance of a digital camera that is an example of an image pickup apparatus to which a display control apparatus according to the invention is applied. FIG. 2 illustrates a schematic configurational block diagram thereof.

A display unit 28 displays an image and various pieces of information. A shutter button 61 is an operation unit through which a photographing instruction is issued. A mode change-over switch 60 is an operation unit for switching between various modes. A connection cable 111 can be connected to a connector 112. An operation unit 70 includes operation members, such as various switches, buttons, and a touch panel for accepting various operations from a user. A controller wheel 73 is a rotatable operation member included in the operation unit 70. A power switch 72 is used for switching between power-on and power-off. A recording medium 200 includes a memory card, a hard disk or the like. The recording medium 200 is stored in a recording medium slot 201, which is closed with a cover 202. The recording medium 200 stored in the recording medium slot 201 is electrically connected to an internal circuit of the digital camera 100.

A configuration illustrated in FIG. 2 is described. A photographing lens 103 includes a zoom lens and a focusing lens. The shutter 101 includes an iris function. An imaging unit 22 includes imaging elements, such as a CCD or a CMOS, that converts an optical image into an electric signal. An A/D converter 23 converts an analog signal output from the imaging unit 22, into a digital signal. A barrier 102 covers an imaging unit including the photographing lens 103 to protect an imaging system including the photographing lens 103, the shutter 101 and the imaging unit 22 against contamination and breakage.

An image processing unit 24 performs resizing processing and color conversion processing, which include predetermined pixel interpolation and reduction, on image data from the A/D converter 23 or image data from a memory control unit 15. The image processing unit 24 performs a predetermined operation process on picked-up image data, and a system control unit 50 performs exposure control and distance measurement control based on an obtained operation result. Thus, a TTL (through-the-lens) type AF (autofocus) process, an AE (autoexposure) process and an EF (flash light pre-emitting) process are performed. The image processing unit 24 further performs a predetermined operation process on picked-up image data, and performs a TTL type AWB (auto white balance) process based on the obtained operation result.

Output data of the A/D converter 23 is directly written into a memory 32 via the image processing unit 24 and the memory control unit 15 or via the memory control unit 15. The memory 32 stores image data, having been obtained by the imaging unit 22 and converted into digital data by the A/D converter 23, and image data to be displayed on the display unit 28. The memory 32 has a storage capacity sufficient for storing a predetermined number of still images and a predetermined time of a moving image and an audio sound.

The memory 32 also serves as a memory (video memory) for displaying an image. A D/A converter 13 converts the image data that is to be displayed and stored in the memory 32, into an analog signal, and supplies the signal to the display unit 28. Thus, the display unit 28 displays an image represented by image data that is to be displayed and is written in the memory 32. The image signal picked up by the imaging unit 22 is sequentially supplied to the display unit 28 via the A/D converter 23, the memory 32 and the D/A converter 13, thereby causing the display unit 28 to function as an electronic viewfinder. Displaying of what is called a through image on the display unit 28 is a function that is called live-view display.

For instance, an EEPROM is adopted as a nonvolatile memory 56, which is an electrically erasable/recordable memory. The nonvolatile memory 56 stores constants and a program for the operation of the system control unit 50. The program described here is a program allowing the system control unit 50 to perform operation that will hereinafter be described with reference to the flowcharts.

The system control unit 50 controls the entire digital camera 100. The system control unit 50 achieves the following processes by executing the control program recorded in the nonvolatile memory 56. The system memory 52 may be a RAM. Constants and variables for the operation of the system control unit 50, and the program read from the nonvolatile memory 56 are deployed on the system memory 52. The system control unit 50 controls the memory 32, the D/A converter 13 and the display unit 28, thereby controlling displaying on the display unit 28.

The system timer 53 is a timer unit for measuring time used for various controls and time of a built-in clock.

The mode change-over switch 60 switches the operation mode of the system control unit 50 to one of a still image recording mode, a moving image recording mode and a reproduction mode. A still image photographing mode includes various operation modes corresponding to imaging conditions and subjects. These operation modes are roughly classified into an applied photographing zone for mainly allowing the user to determine exposure and perform photography setting, and a simple photographing zone for mainly allowing the digital camera 100 to automatically determine exposure (a shutter speed and an iris value) and perform photography setting. The applied photographing zone includes a program AE mode (P mode), a shutter-priority AE mode (Tv mode), an iris priority AE mode (Av mode) and a manual exposure mode (M mode). The simple photographing zone includes a no strobe-emitting mode, a creative auto mode (CA mode), a portrait mode, a scenery mode, a close-up (macro) mode, a sport mode and a special scene mode (SCN mode).

Furthermore, after the mode change-over switch 60 sets the mode to the special scene mode, the following operation modes can be selected using the operation unit 70. That is, a kids mode, a cooking mode, a candle light mode, a night view portrait mode, a hand-held night view mode and a HDR (high dynamic range) backlight correction mode can be selected as the special scene mode (SCN mode).

The mode can be directly switched to one of these modes included in the still image photographing mode, using the mode change-over switch 60. After the mode change-over switch 60 switches the mode to the still image photographing mode, the mode may be switched to one of these modes included in the still image photographing mode using the operation unit 70. Likewise, a moving image photographing mode also includes a plurality of modes.

A first shutter switch 62 is turned on by what is called half depression (photographing preparation instruction) during the operation on the shutter button 61, so that a first shutter switch signal SW1 is generated. According to the first shutter switch signal SW1, the system control unit 50 starts the operations of the AF process, the AE process, the AWB process the EF process, and the like.

A second shutter switch 64 is turned on by completion of the operation on the shutter button 61, i.e., what is called full depression (photographing instruction), so that a second shutter switch signal SW2 is generated. According to the second shutter switch signal SW2, the system control unit 50 starts a series of photographing processes from reading of a signal from the imaging unit 22 up to writing of image data into the recording medium 200.

The operation unit 70 includes a touch panel arranged on a screen of the display unit 28. Through selection of and operation on various functional icons displayed on the display unit 28, operational instructions assigned to the respective functional icons can be input into the system control unit 50. Functional buttons include, for instance, a finish button, a back button, an image-feeding button, a jump button, a narrowing-down button and an attribute change button. For instance, when a menu button is depressed, various setting menu screens are displayed on the display unit 28. The user can perform various settings using the menu screen displayed on the display unit 28, and functional buttons on the screen, four-direction button including upward, downward, right and left directions (four-way operative key) and a SET button.

The controller wheel 73 is a rotatable operation member included in the operation unit 70, and used together with a directional button to designate a selected item. Rotational operation on the controller wheel 73 generates electric pulse signals according to the amount of operation. Based on the pulse signal, the system control unit 50 controls each part of the digital camera 100. According to the pulse signal, the system control unit 50 can determine the angle at which controller wheel 73 is rotationally operated and the amount of rotation.

A power source control unit 80 includes a battery detection circuit, a DC-DC converter and a switch circuit for switching a block to be turned on, and detects attachment or detachment of a battery, the type of a battery and the remaining battery capacity. The power source control unit 80 controls the DC-DC converter based on the detection result and an instruction from the system control unit 50, and supplies a required voltage to each of parts that include the recording medium 200 for a required time.

A power source unit 30 includes: a primary battery, such as an alkaline battery or a lithium battery; a secondary battery, such as a NiCd battery, a NiMH battery or a Li battery, or an AC adapter. The recording medium 200, such as a memory card or a hard disk, is connected to an interface 18.

A communication unit 54 can communicate with another apparatus wirelessly or via a wired cable, and transmit and receive a picture signal and an audio sound signal. The communication unit 54 can be connected to a wireless LAN (Local Area Network) and the Internet. The communication unit 54 can transmit an image (including a through image) picked up by the imaging unit 22 and an image recorded in the recording medium 200, and receive image data and other various pieces of information from an outside apparatus.

An attitude detection unit 55 detects the attitude of the digital camera 100 with respect to the gravitational direction. The system control unit 50 can determine whether the image picked up by the imaging unit 22 is an image picked up with the digital camera 100 being horizontally held or an image taken with this camera being vertically held, based on the attitude detected by the attitude detection unit 55. The system control unit 50 can add direction information according to the attitude detected by the attitude detection unit 55 to an image file of the picked-up image, and record the picked-up image in a rotated manner. The attitude detection unit 55 may be an acceleration sensor or a gyro sensor.

In this embodiment, a setting menu or a menu screen is displayed that is different in at least a portion of menu items, in accordance with the operation mode. For instance, such a menu screen is the screens include menu screens for image pickup and menu screens for reproduction.

Figure 3A:
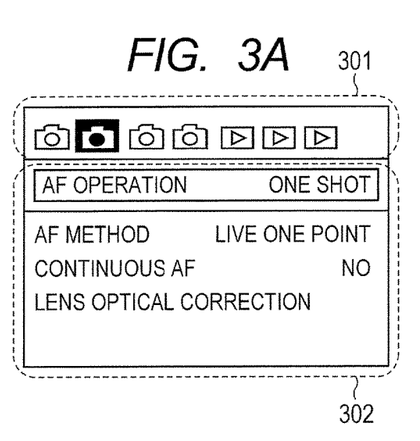
FIGS. 3A, 3B, 3C, 3D, 3E and 3F illustrate examples of transition between menu screens of this embodiment.

FIGS. 3A to 3F illustrate displayed examples of menu screens on the display unit 28. In the example illustrated in FIG. 2, the menu screen includes a tab display region 301 and an item display region 302. In the tab display region 301, a plurality of tabs are displayed. In FIG. 3A, seven tabs are displayed. The tabs correspond respectively to a photography setting 1, a photography setting 2, a photography setting 3, a photography setting 4, a reproduction setting 1, a reproduction setting 2 and a reproduction setting 3 from the left. The tabs are at a higher layer than the layer of setting items on the menu screen. Any of these tabs can be selected by an operation on the right key or the left key (hereinafter, a right/left key) of the four-way operative key of the operation unit 70. The menu items included in the selected tab is displayed in the item display region 302 as a lower layer.

In FIG. 3A, a tab for the photography setting 2 is selected. Four menu items, i.e., "AF Operation", "AF Method", "Continuous AF" and "Lens Optical Correction" are displayed as menu items corresponding to the tab for the photography setting 2. Any of these menu items can be selected by an operation on the upper key or the lower key (hereinafter, called an up/down key) of the four-way operative key of the operation unit 70. When the user depresses the SET button in the state where any one of the menu items of the menu is displayed as a selected menu item, the system control unit 50 transitions to a setting screen pertaining to the selected menu item, and the user can set and change the setting value of the setting item on the setting screen. The system control unit 50 stores the set or changed setting value in the nonvolatile memory 56.

Hereinafter, selection of a tab or a menu item is expressed as "focusing"; a selected menu item is expressed as a "focus item"; and changing of a selected tab or menu item is expressed as "focus movement".

Figure 3B:
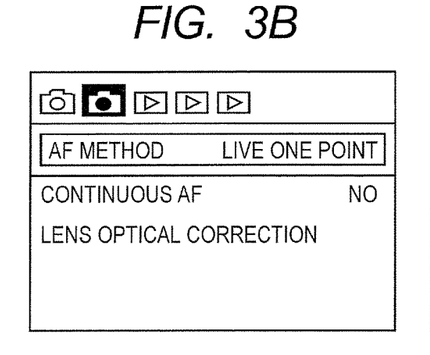

Even with the same tab, the corresponding menu item is different according to whether the currently set photographing mode is a photographing mode included in the applied photographing zone or a photographing mode included in the simple photographing zone. For instance, FIG. 3A illustrates a displayed example in a case where a photographing mode included in the applied photographing zone is set and the tab for the photography setting 2 is selected. The foregoing four menu items are displayed as menu items corresponding to the tab for the photography setting 2 in the applied photographing zone. Meanwhile, FIG. 3B illustrates a displayed example in a case where a photographing mode included in the simple photographing zone is set and the tab for the photography setting 2 is selected. The number of menu items corresponding to the tab for the photography setting 2 in the simple photographing zone is smaller than that of the case of FIG. 3A by one and the item for "AF Operation" is not displayed.

Furthermore, the number of displayed tabs is different according to whether the currently set photographing mode is a photographing mode included in the applied photographing zone or a photographing mode included in the simple photographing zone. For instance, in FIG. 3A illustrating the displayed example in the case where a photographing mode included in the applied photographing zone is set, seven tabs are displayed. Meanwhile, in FIG. 3B illustrating the displayed example in the case where a photographing mode included in the simple photographing zone is set, five tabs the number of which is smaller by two than the case of FIG. 3A are displayed and the tab for the photography setting 3 and the tab for the photography setting 4 are not displayed.

Figure 4A:
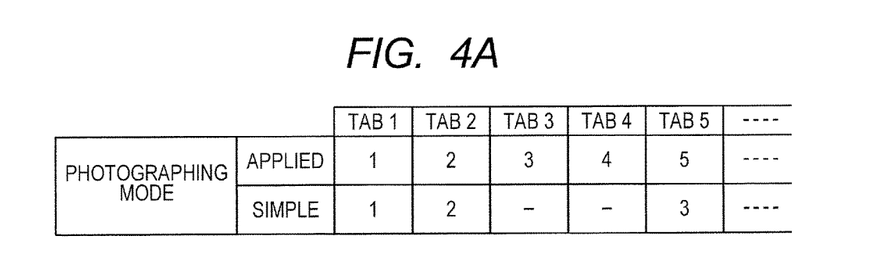
FIGS. 4A, 4B and 4C are examples of tables stored in a nonvolatile memory 56.
Figure 4B:
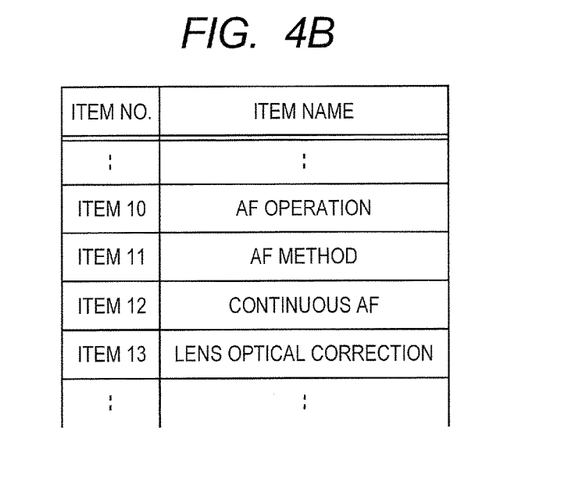
Figure 4C:
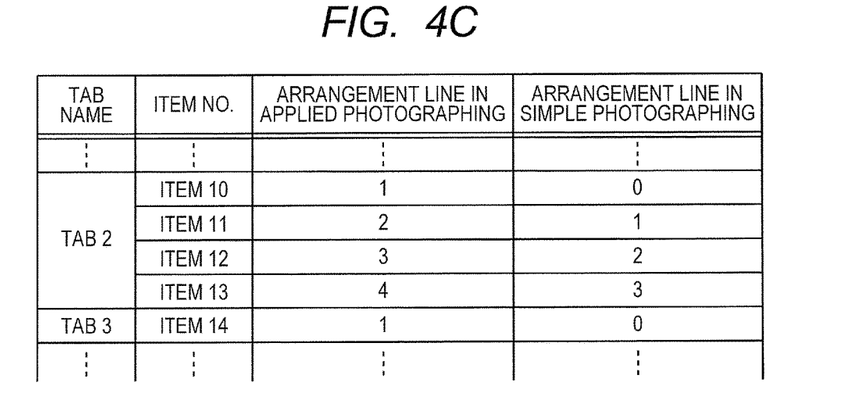

FIGS. 4A to 4C illustrate tables indicating which tab is to be displayed in the applied photographing zone and the simple photographing zone and which menu item is to be displayed for the tab. Information of content corresponding to tables illustrated in FIGS. 4A to 4C is stored as management information in the nonvolatile memory 56.

The table of FIG. 4A illustrates the display positions of the tabs in each of the applied photographing zone and the simple photographing zone (the position numbered from the left in the tab display region 301). In FIG. 4A, the photography setting 1, the photography setting 2, the photography setting 3, the photography setting 4, the reproduction setting 1, the reproduction setting 2 and the reproduction setting 3 are represented as the tabs 1 to 7, respectively. In FIG. 3A, the tabs 6 and 7 are omitted. According to this table, during setting in a photographing mode in the applied photographing zone, the tab 3 (the tab for the photography setting 3) and the tab 4 (the tab for the photography setting 4) are displayed at the third and fourth positions from the left, respectively. However, these tabs are not displayed during setting of a photographing mode in the simple photographing zone. According to this embodiment, it is assumed as an example for illustrative purpose that all tabs are displayed in the applied photographing zone and there is no tab that is displayed in the simple photographing zone but is not displayed in the applied photographing zone. It is a matter of course that, in consideration of actual implementation, there may be a tab that is displayed in the simple photographing zone but is not displayed in the applied photographing zone.

FIG. 4B illustrates a correspondence table between the names of menu items that can be displayed in the item display region 302 (character strings to be displayed) and the item numbers for identifying the items (IDs used for management). For instance, the item number 10 corresponds to the menu item of "AF Operation". In FIG. 4B, the numbers preceding to the item 10 and the numbers succeeding to the item 13 are omitted.

FIG. 4C illustrates a correspondence table defining which menu item is to be displayed in a menu screen of each tab in each of the applied photographing zone and the simple photographing zone. The correspondence table defines which menu item is to be arranged on each line of a menu of a tab. Note that "0" indicates that the item is not displayed on the tab concerned. The tabs before the tab 2 and the items and tabs after the one item of the tab 3 are omitted.

According to the correspondence table illustrated in FIG. 4C, in the case where a photographing mode in the applied photographing zone is set, the menu items for tab 2 are configured such that the item 10 is arranged on the first line, the item 11 is arranged on the second line, the item 12 is arranged on the third line, and the item 13 is arranged on the fourth line. As a result, the menu screen as illustrated in FIG. 3A is displayed. According to the correspondence table illustrated in FIG. 4C, in a case where a photographing mode in the simple photographing zone is set, the menu items for the tab 2 are configured such that the item 11 is arranged on the first line, the item 12 is arranged on the second line, and the item 13 is arranged on the third line. The item 10 is not displayed. As a result, the menu screen as illustrated in FIG. 3B is displayed. Thus, as illustrated in FIGS. 3A and 3B, even for the same tab, the result is obtained such that the corresponding menu item is different according to whether the currently set photographing mode is a photographing mode included in the applied photographing zone or a photographing mode included in the simple photographing zone.

According to this embodiment, when a menu screen is opened by depressing a menu button in a state where the menu screen is not opened, a menu item which was selected last for the tab selected when the menu screen is opened last is displayed in a selected state. If a user has performed no operation and opened no menu screen, as with a case of immediately after factory shipment or after initialization of the digital camera 100, when the user initially opens a menu screen, the tab 1 is opened as a default (initial value). Information on which menu item is to be opened when the menu is opened (i.e., a default value or information indicating a tab for a menu screen having been finally opened last time) is stored in the nonvolatile memory 56.

Figure 5A:
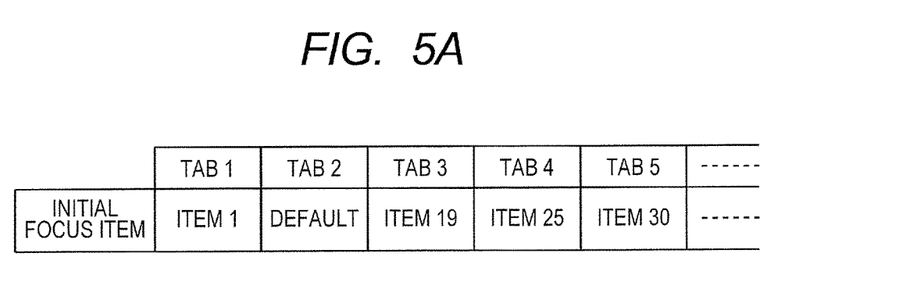
FIGS. 5A and 5B are examples of configurations and contents of a focus position table.
Figure 5B:
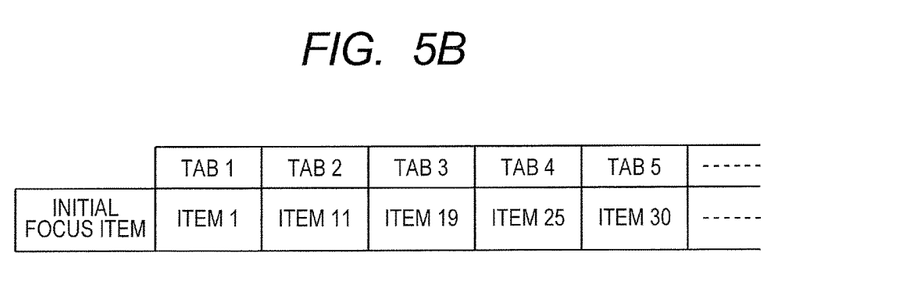

Information indicating which menu item is set to a selected state when the menu screen is opened is stored in the nonvolatile memory 56 for each tab. FIGS. 5A and 5B illustrate an example of information on which menu item is selected when the menu screen for each tab is opened (a focus position table, initial focus item management information for each tab). Such information is stored in the nonvolatile memory 56. The initial focus item is basically an item finally selected last time. On each time when the user changes the focus item or each time when the menu screen is displayed to achieve an initial focus, the system control unit 50 updates the item number of the initial focus item for the tab concerned to the item number of the latest focus item.

If the user has never changed the focus item in the tab, i.e., if the user has never operated the up/down key in a state where the tab is opened, the item number of the focus item is not updated and left as "default". The "default" represents that the state is a state before the change operation on the menu item. In this embodiment, the "default" does not indicate the item number itself but indicates the item arranged at the top of the tab. The item arranged at the top of the tab is a tab where the arrangement line is "1" with reference to the table illustrated in FIG. 4C. For instance, as to the tab 2, the top is the item 10 (AF operation) in the applied photographing zone and the item 11 (AF method) in the simple photographing mode. Thus, the "default" is not information identifying the item itself, but is information indicating the position of the menu item on the menu screen for the tab (the position corresponds to a line because the menu items are vertically arranged in this embodiment).

FIG. 5A illustrates an example of a focus position table indicating the initial focus item for each tab in the case where the user has never changed the focus item on the menu screen for the tab 2. For instance, the user opens the tab 1 and performs an up/down key operation to move the focus from an item other than the item 1 to the item 1. This operation updates the initial focus frame for the tab 1 is updated to the item 1. In this state, the tab is changed from the tab 1 to the tab 2 through the right key to display the menu screen for the tab 2. If the initial focus frame for the tab 2 is "default" at this time, the state where the menu item on the first line is selected is displayed. If no operation is performed during displaying the menu screen for the tab 2 and then the right key is depressed again to change the tab to the tab 3, the initial focus item for the tab 2 is not updated and is left as "default".

In a case where the initial focus item stored in the focus position table is not "default" during displaying the menu screen for the tab 3, the system control unit 50 focuses the initial focus item stored in the focus position table. The system control unit 50 updates information of the initial focus for the tab 3 using the item number of the initially focused item. Subsequently, the focus item is changed to the item 19 on the menu screen for the tab 3 through a up/down key operation by the user, thereby updating the initial focus item for the tab 3 to the item 19. Thus, the focus position table as illustrated in FIG. 5A is generated. Description on operations on the tabs 4 and 5 is omitted.

After the focus position table illustrated in FIG. 5A is generated, when the user opens the menu screen for the tab 1 according to the focus position table illustrated in FIG. 5A, the system control unit 50 displays the menu screen for the tab 1 on the display unit 28 in a state where the item 1 is selected. If the user performs no operation thereafter but depresses the right key to change the tab to the tab 2, the system control unit 50 displays the menu screen for the tab 2 on the display unit 28 in a state of a default according to FIG. 5A, i.e., a state where the menu item on the first line is selected. If the user performs no operation on this menu screen but depresses the right key to change the tab to the tab 3, the system control unit 50 displays the menu screen for the tab 3 on the display unit 28 in a state where the item 19 is selected according to FIG. 5A from among the menu items included in the tab 3.

Thus, in this embodiment, the menu item operated last for each tab is displayed in a selected state. Accordingly, the user can quickly perform an operation subsequent to the operation last time. Alternatively, as to the item whose setting is often changed, a setting operation can be performed without a selecting operation to be performed each time of switching the tab.

It is determined whether the focus position table for the tab is to be updated, in accordance with whether the "default" is recorded in the focus position table or not. In the case of the "default", the system control unit does not update the focus position table for the tab unless the user moves the focus item through an operation on the up/down key in a state where the menu screen is displayed. If the "default" is not recorded and the user moves the focus item through an up/down key operation, the system control unit 50 updates the focus position table concerning the tab. Update is also made if the "default" is not recorded and the focus item is changed after an operation on the mode change-over switch 60 switches between a photographing mode in the applied photographing zone and a photographing mode in the simple photographing zone during displaying the menu screen. Update is also made based on the initially focused menu item when the menu screen is opened by depressing the menu button or when the tab is switched through a right/left key operation.

The system control unit 50 initializes the focus position table illustrated in FIG. 5A according to an operation by the user on initialized items included in the menu. As a result, the "default" is stored as initial information for every tab in the focus position table illustrated in FIG. 5A.

Figure 3C:
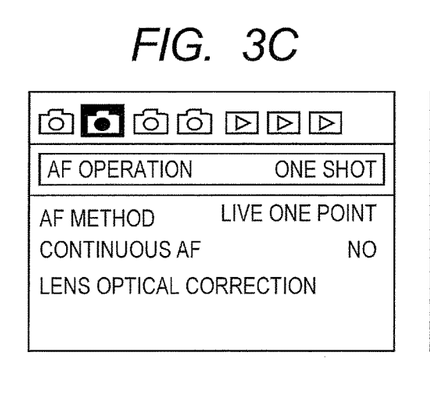

FIGS. 3A to 3C correspond to displayed examples in a case where the menu screen for the tab 2 is displayed in a state of the focus position table illustrated in FIG. 5A, the user switches from the applied photographing zone to the simple photographing zone and further switches to the applied photographing zone.

FIG. 3A corresponds to an example where the menu screen for the tab 2 is displayed in a state where a photographing mode in the applied photographing zone is set. According to the value of "default", which is a value of the initial focus item for the tab 2, the first line (the item 10: AF operation in the applied photographing zone) is focused. In this case, the value of the initial focus item for the tab 2 is left as the "default" and is not updated. If, in this state, the user does not operate the up/down key but operates the mode change-over switch 60 to switch the mode to a photographing mode in the simple photographing zone, the system control unit 50 switches the display to the display illustrated in FIG. 3B.

In FIG. 3B, according to the value of "default" of the initial focus item for the tab 2 (the item 11: AF method in the simple photographing zone), the first line is focused. In FIG. 3A, a focused item exists. Accordingly, the focused item in FIG. 3B is different from the focused item in FIG. 3A. However, according to the value "default" of the initial focus item for the tab 2, the menu screen illustrated in FIG. 3B is displayed. Accordingly, the value of the initial focus item for the tab 2 is left as the "default" and is not updated. If, in this state, the user does not operate the up/down key but operates the mode change-over switch 60 to switch the mode to a photographing mode in the applied photographing zone, the system control unit 50 switches the screen to the menu screen illustrated in FIG. 3C.

In the menu screen illustrated in FIG. 3C, according to the value of "default" of the initial focus item for the tab 2, the first line (the item 10: AF operation in the applied photographing zone) is focused. This menu screen is the same as the menu screen illustrated in FIG. 3A.

Thus, if the user has not performed an operation of moving the focus item, the focus position is maintained for the same tab in the same photographing mode even if zone switching is performed through an operation on the mode change-over switch 60. That is, if no focus movement operation is performed, unintentional change in focus position only through an operation on the mode change-over switch 60 can be prevented. Thus, unnatural impression is not given to the user.

Figure 3D:
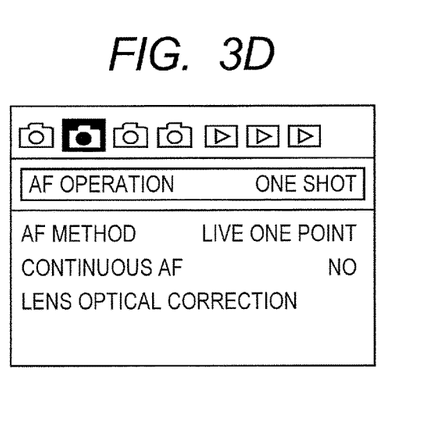
Figure 3E:
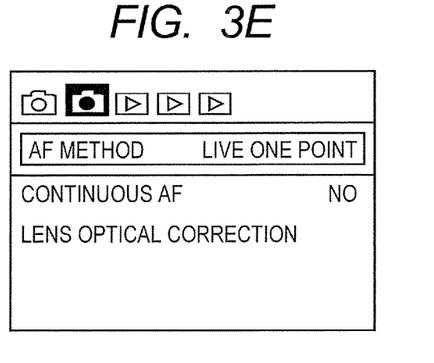
Figure 3F:
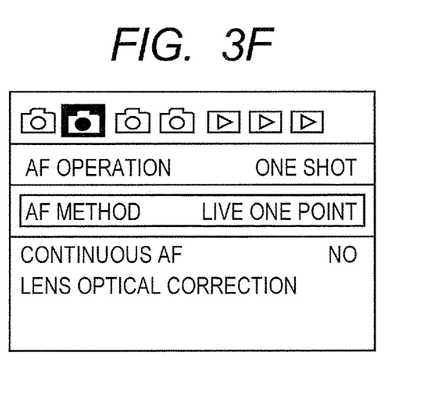

FIGS. 3D to 3F correspond to displayed examples in the case where the applied photographing zone is switched to the simple photographing zone, which is further switched to the applied photographing zone, in a state where a menu screen for a tab for which a value other than the "default" is recorded in the focus position table for each tab is displayed.

FIG. 3D corresponds to an example of displaying the menu screen for the tab 2 in a state where a photographing mode in the applied photographing zone is set. In FIG. 3D, the item 10: AF operation is focused. At this time, the system control unit 50 updates the value of the initial focus item for the tab 2 to the "item 10". If, in this state, the user does not operate the up/down key but operates the mode change-over switch 60 to switch the mode to a photographing mode in the simple photographing zone, the system control unit 50 switches the screen to the menu screen in FIG. 3E.

In the photographing mode in the simple photographing zone on the menu screen illustrated in FIG. 3E, the "item 10" that is the value of the initial focus item for the tab 2 does not exist. Accordingly, the system control unit 50 brings the "item 11: AF method", which is the top item, into a focus state, i.e., a selected state. At this time, the system control unit 50 updates the value of the initial focus item for the tab 2 to the "item 11". If in this state the user does not operate the up/down key but operates the mode change-over switch 60 to switch the mode to a photographing mode in the applied photographing zone, the system control unit 50 switches the screen to the menu illustrated in FIG. 3F.

On the menu screen illustrated in FIG. 3F, the system control unit 50 focuses the "item 11: AF method" arranged on the second line according to the value "item 11" of the initial focus item for the tab 2. As a result, an item at a position different from the position on the menu screen illustrated in FIG. 3D is focused.

If a value other than the "default" is recorded as the initial focus frame, the focus position in the case where the same tab is displayed in the same photographing mode may be changed only through displaying the menu screen and then operating the mode change-over switch 60. If there is a menu item that has the same item number as the menu item focused immediately before switching through an operation on the mode change-over switch 60, the system control unit 50 focuses the same item as the immediately previous focus item irrespective of the display position. For instance, the item 11 on the menu screen illustrated in FIG. 3F corresponds to the item 11 on the menu screen illustrated in FIG. 3E.

Thus, this embodiment can prevent the menu item being selected from being changed in the middle of the operation thereof by an operation on the mode change-over switch 60, and provide favorable operation for a user who has started the operation.

Figure 6A:
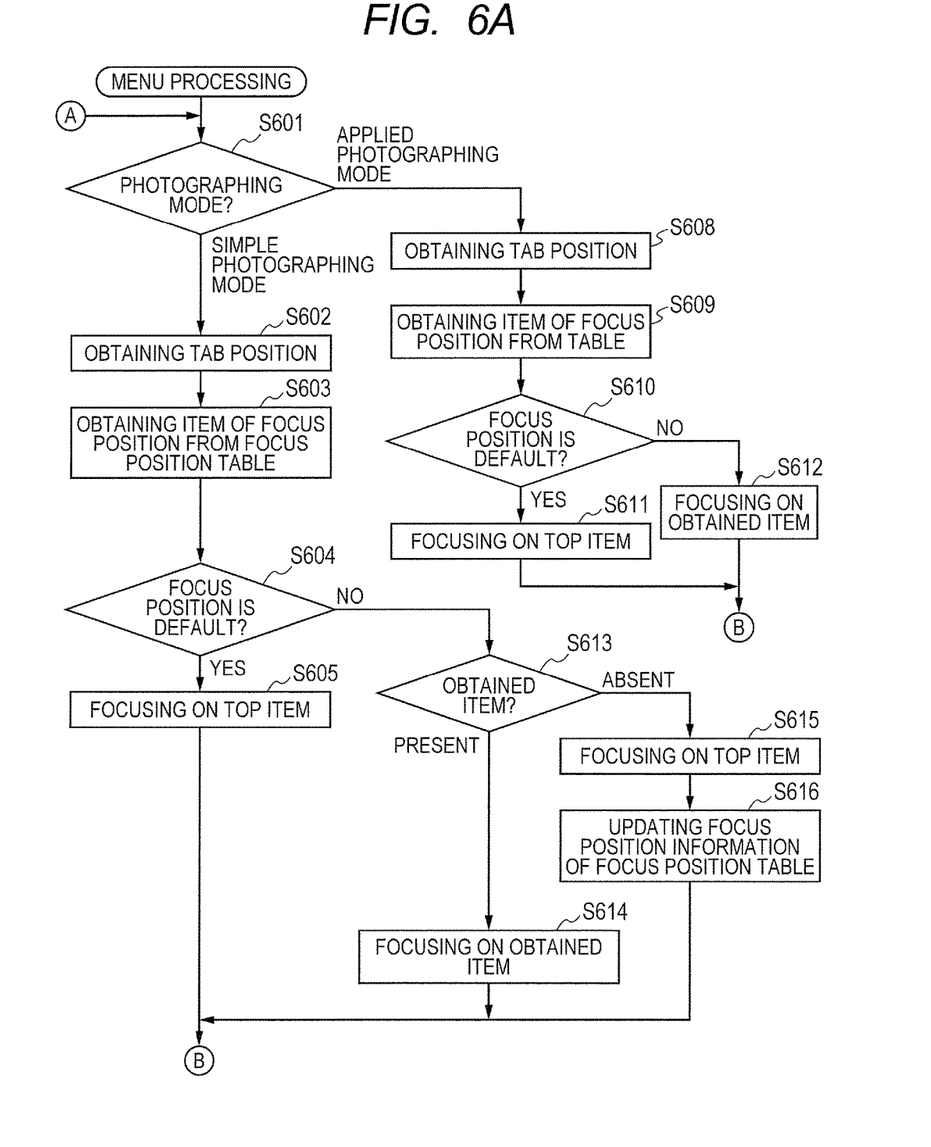
FIGS. 6A and 6B are operation flowcharts of this embodiment.
Figure 6B:
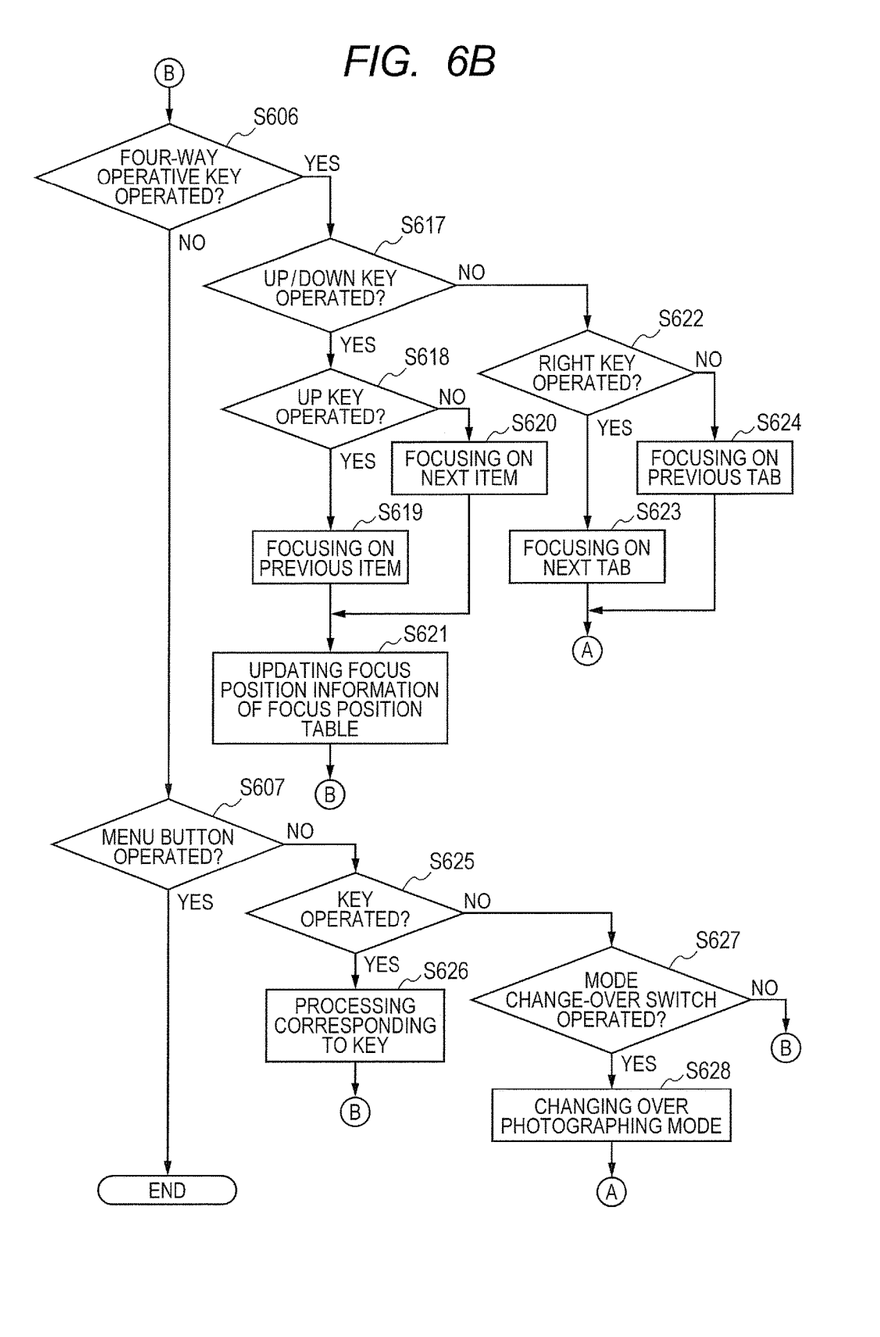

FIGS. 6A and 6B are flowcharts of menu screen processing of this embodiment that achieve the foregoing processing operations. The program recorded in the nonvolatile memory 56 is deployed on the system memory 52 and executed by the system control unit 50, thus achieving this processing.

In S601, the system control unit 50 determines whether the photographing mode is in the simple photographing zone or the applied photographing zone. If the mode is in the simple photographing zone, the processing proceeds to S602. If the mode is in the applied photographing zone, the processing proceeds to S608.

If the mode is determined as the simple photographing zone (S601), the system control unit 50 obtains the stored current tab position (S602), obtains the focus item for the current tab position from the focus position table (S603), and the processing proceeds to S604.

In S604, the system control unit 50 determines whether the focus item obtained in S603 is default or not. If the item is default, the system control unit 50 focuses the top item for the current tab in S605 and the processing proceeds to S606. Instead, if it is determined that the item is not default, the system control unit 50 advances the processing to S613.

In S613, the system control unit 50 determines whether the focus item obtained in S603 exists in the menu in the simple photographing zone or not. If this item exists in the menu in the simple photographing zone (S613), the system control unit 50 displays (S614) the focus item obtained in S603 and the processing proceeds to S606. Instead, if the item does not exist in the menu in the simple photographing zone (S613), the system control unit 50 displays the top item in a focused manner in S615, the value of the focus position table is set to the top item as initial-selection information in S616, and the processing proceeds to S606.

If it is determined as the applied photographing zone (S601), the system control unit 50 obtains the current tab position stored in S608, obtains the focus item for the current tab position from the focus position table in S609 and the processing proceeds to S610.

In S610, the system control unit 50 determines whether the focus item obtained in S609 is default or not. In the case of default (S610), the system control unit 50 focuses the top item for the current tab in S611, and the processing proceeds to S606. Instead, if the item is not default (S610), the system control unit 50 advances the processing to S612, displays the focus item obtained in S609 in a focused manner, and advances the processing to S606.

In S606, the system control unit 50 determines whether the four-way operative key is operated or not. If the four-way operative key is operated, the processing proceeds to S617. If the four-way operative key is not operated, the processing proceeds to S607.

In S617, the system control unit 50 determines whether the up/down key is operated or not. If the up/down key is operated (S617), the system control unit 50 determines whether the operated key is the up key or the down key in S618. In the case of the up key (S618), the system control unit 50 displays the previous item in a focused manner in S619, and the processing proceeds to S621. Instead, in the case of the down key (S618), the system control unit 50 displays the next item in a focused manner in S620, and the processing proceeds to S621.

In S621, the system control unit 50 updates the value of the focus position table to the value of the item displayed with the current focus, which is to be initial-selection information, and the processing returns to S606.

If the up/down key is not operated in S617, it means that the right/left key is operated, and then the system control unit 50 determines whether the key is the right key or the left key in S622. In the case of the right key (S622), the system control unit 50 updates the current tab position stored in S623 to the right tab, and the processing returns to S601. Instead, if the key is the left key (S622), the system control unit 50 updates the current tab position stored in S624 to the left tab, and the processing returns to S601.

In S607, the system control unit 50 determines whether the menu button is operated or not. If the menu button is operated, this flowchart is finished. Instead, if the menu button is not operated (S607), the system control unit 50 determines whether another key is operated or not in S625. If another key is operated (S625), the system control unit 50 performs a process corresponding to the key operation in S626 and returns the processing to S606. Instead, no key is operated (S625), the system control unit 50 determines whether the mode change-over switch 60 is operated or not in S627. If the mode change-over switch 60 is operated (S627), the system control unit 50 switches the photographing mode to the operation mode corresponding to the operation in S628 and returns the processing to S601. If the mode change-over switch 60 is not operated (S627), the system control unit 50 returns the processing to S606.

As described above, this embodiment controls the display of focusing state based on whether focus movement is made for each tab and, based on information on which item is to be focused if focus movement is made. Accordingly, if the user has made focus movement, focus the position after movement is focused. If no focus movement is made, the position for the initial state can be focused.

The control by the system control unit 50 may be performed using one piece of hardware. Alternatively, multiple pieces of hardware may share the processing to achieve the control of the entire apparatus.

The embodiment where the present invention is applied to the digital camera has been described. However, the present invention is not limited to this embodiment. Alternatively, the present invention is generally applicable to a display control apparatus capable of displaying any types of choices in a menu. That is, the present invention is applicable to a personal computer, a PDA, a mobile phone terminal, a mobile image viewer, a printer apparatus including a display, a digital photo frame, a music player, a game machine, and an electronic book reader.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-121306, filed on Jun. 7, 2013, which is hereby incorporated by reference herein in its entirety.

What is claimed is:

1. A display control apparatus, comprising:
an operation unit configured to accept a selection operation by a user of selecting one of a plurality of menu items included in a menu set, the menu set including a first menu containing a first set of settable items relating to a function that are selectable in a first operation mode and a second menu containing a second set of settable items relating to the function that are selectable in a second operation mode, the first set of settable items including at least one settable item that is not included in the second set of settable items;
a recording unit configured to, after the operation unit accepts the selection operation, record information specifying the menu item selected by the selection operation as initial-selection information for an associated menu that represents information of a menu item to be initially displayed in a selected state the next time the associated menu is displayed, wherein, before the operation unit accepts the selection operation, initial information representing that no menu item has been selected by the user for the associated menu is stored in the recording unit; and
at least one CPU and one memory, cooperating to function as:
a setting unit configured to set one of the first and second operation modes; and
a display control unit configured to
in the first operation mode, control to display the first menu in which a first menu item is displayed at a first position and a second menu item is displayed at a second position, and
in the second operation mode, control to display the second menu in which the first menu item is not included and the second menu item is displayed at the first position, and
(a) in a case where the initial information is not stored and, in the second operation mode, a menu item of the second menu that is selected by the user via the operation unit and displayed in a selected state in a way that is visually discriminable from other displayed menu items is different from a menu item of the first menu that was displayed in the selected state in the first operation mode before change of the operation mode, the recording unit records information specifying the different menu item being displayed in a visually discriminable way as the initial-selection information, and
in a case where the second operation mode is switched to the first operation mode by the setting unit, in a state where a menu item included in the second menu has been selected by a user via the operation unit in the second operation mode and the second menu item is being displayed in the selected state, which is visually discriminable from other displayed menu items, control to display the first menu in a state where the menu item selected in the second operation mode is displayed in the first menu in the selected state, which is visually discriminable from other displayed menu items, based on the initial-selection information stored in the recording unit, and
(b) in a case where the initial information is stored and, in the second operation mode, a menu item of the second menu that is displayed in a selected state in a way that is visually discriminable from other displayed menu items is different from a menu item of the first menu that was displayed in the selected state in the first operation mode before change of the operation mode due to changing of the operation mode set by the setting unit, the recording unit does not record information specifying the different menu item as the initial-selection information, and
in a case where the second operation mode is switched to the first operation mode by the setting unit, in a state where no menu items included in the second menu have been selected by the user via the operation unit in the second operation mode, control to display the first menu in a state where the first menu item displayed at the first position is displayed in the selected state in a way that is visually discriminable from other displayed menu items, based on the initial information stored in the recording unit.

2. The display control apparatus according to claim 1, wherein the first position is a position of a top menu item in the menu to be displayed.

3. The display control apparatus according to claim 1, wherein, in a case of displaying a menu in a state where no menu is displayed, the display control unit performs control to display the menu in such a manner that one of the menu items of the menu is displayed in the selected state based on information recorded in the initial-selection information.

4. The display control apparatus according to claim 1, wherein, in a case where the second menu displayed in the second operation mode is changed to the first menu to be displayed in the first operation mode and if the initial information is stored, the display control unit performs control to display in the selected state a menu item at the first position in the first menu, and, if the initial information is not stored and the initial-selection information is stored, the display control unit performs control to display in the selected state a menu item based on the initial-selection information.

5. The display control apparatus according to claim 1, wherein the recording unit initializes the initial-selection information in response to an initialization operation by a user, and records the initial information.

6. The display control apparatus according to claim 1,
wherein the display control unit performs control to display a plurality of different menus in a same operation mode set in the setting unit, and the initial information is stored for each of the different menus, and
wherein the recording unit records the initial-selection information for each of the menus.

7. The display control apparatus according to claim 1, wherein the display control apparatus is an imaging apparatus including an imaging unit, and a menu displayed by the display control unit includes at least one of a setting menu for image pickup, and a setting menu for a reproduction unit.

8. A method of controlling a display control apparatus, the method comprising:
   accepting a selection operation by a user of selecting one of a plurality of menu items included in a menu set, the menu set including a first menu containing a first set of settable items relating to a function that are selectable in a first operation mode and a second menu containing a second set of settable items relating to the function that are selectable in a second operation mode, the first set of settable items including at least one settable item that is not included in the second set of settable items;
   recording in a recording unit, after the selection operation is accepted, information specifying the menu item selected by the selection operation as initial-selection information for an associated menu that represents information of a menu item to be initially displayed in a selected state the next time the associated menu is displayed, wherein, before the selection operation is accepted, initial information representing that no menu item has been selected by the user for the associated menu is stored in the recording unit;
   setting one of the first and second operation modes; and
   performing display control of
      in the first operation mode, displaying the first menu in which a first menu item is displayed at a first position and a second menu item is displayed at a second position, and
      in the second operation mode, displaying the second menu in which the first menu item is not included and the second menu item is displayed at the first position, and
      (a) in a case where the initial information is not stored and, in the second operation mode, a menu item of the second menu that is selected by the user via the selection operation and displayed in a selected state in a way that is visually discriminable from other displayed menu items is different from a menu item of the first menu that was displayed in the selected state in the first operation mode before change of the operation mode, recording information specifying the different menu item as the initial-selection information in the recording unit, and
      in a case where the second operation mode is switched to the first operation mode in the setting step, in a state where a menu item included in the second menu has been selected by a user via the selection operation in the second operation mode and the second menu item is being displayed in the selected state, which is visually discriminable from other displayed menu items, displaying the first menu in a state where the menu item selected in the second operation mode is displayed in the first menu in the selected state, which is visually discriminable from other displayed menu items, based on the initial-selection information stored in the recording unit, and
      (b) in a case where the initial information is stored and, in the second operation mode, a menu item of the second menu that is displayed in a selected state in a way that is visually discriminable from other displayed menu items is different from a menu item of the first menu that was displayed in the selected state in the first operation mode before change of the operation mode due to changing of the operation mode set by the setting unit, not recording information specifying the different menu item as the initial-selection information, and
      in a case where the second operation mode is switched to the first operation mode in the setting step, in a state where no menu items included in the second menu have been selected by the user via the selection operation in the second operation, displaying the first menu in a state where the first menu item displayed at the first position is displayed in the selected state in a wa that is visually discriminable from other displayed menu items based on the initial information stored in the recording unit,
   wherein the setting step and the display control step are performed by a CPU operating in conjunction with a memory device.

9. A non-transitory computer-readable storage medium storing a program that when executed causes a computer to perform a method of controlling a display control apparatus, the method comprising:
   accepting a selection operation by a user of selecting one of a plurality of menu items included in a menu set, the menu set including a first menu containing a first set of settable items relating to a function that are selectable in a first operation mode and a second menu containing a second set of settable items relating to the function that are selectable in a second operation mode, the first set of settable items including at least one settable item that is not included in the second set of settable items;
   recording in a recording unit, after the selection operation is accepted, information specifying the menu item selected by the selection operation as initial-selection information for an associated menu that represents information of a menu item to be initially displayed in a selected state the next time the associated menu is displayed, wherein, before the selection operation is accepted, initial information representing that no menu item has been selected by the user for the associated menu is stored in the recording unit;
   setting one of the first and second operation modes; and
   performing display control of
      in the first operation mode, displaying the first menu in which a first menu item is displayed at a first position and a second menu item is displayed at a second position, and
      in the second operation mode, displaying the second menu in which the first menu item is not included and the second menu item is displayed at the first position, and
      (a) in a case where the initial information is not stored and, in the second operation mode, a menu item of the second menu that is selected by the user via the selection operation and displayed in a selected state in a way that is visually discriminable from other displayed menu items is different from a menu item of the first menu that was displayed in the selected state in the first operation mode before change of the operation mode, recording information specifying the different menu item as the initial-selection information in the recording unit, and
      in a case where the second operation mode is switched to the first operation mode in the setting step, in a state where a menu item included in the second menu has been selected by a user via the selection operation in the second operation mode and the second menu item is being displayed in the selected state, which is visually discriminable from other displayed menu items, displaying the first menu in a state where the menu item selected in the second operation mode is displayed in the first menu in the selected state, which is visually discriminable from other displayed menu items, based on the initial-selection information stored in the recording unit, and (b) in a case where the initial information is stored and, in the second operation mode, a menu item of the second menu that is displayed in a selected state in a way that is visually discriminable from other displayed menu items is different from a menu item of the first menu that was displayed in the selected state in the first operation mode before change of the operation mode due to changing of the operation mode set by the setting unit, not recording information specifying the different menu item as the initial-selection information, and in a case where the second operation mode is switched to the first operation mode in the setting step, in a state where no menu items included in the second menu have been selected by the user via the selection operation in the second operation, displaying the first menu in a state where the first menu item displayed at the first position is displayed in the selected state in a wa that is visually discriminable from other displayed menu items based on the initial information stored in the recording unit.

10. The display control apparatus according to claim 1, wherein, in a case where the first operation mode is switched to the second operation mode by the setting unit, in a state where a menu item included in the first menu has been selected by the user in the first operation mode and the first menu item is being displayed in the selected state in the first menu, the display control unit is configured to control to display the second menu in the state where the second menu item displayed at the first position is displayed in the selected state, because the menu item selected in the first menu does not exist in the second menu, and to perform the control (a) in the case where the second operation mode is switched to the first operation mode by the setting unit from said state.

11. The display control apparatus according to claim 1, wherein, in a case where the first operation mode is switched to the second operation mode by the setting unit, in a state where no menu items included in the first menu have been selected by the user in the first operation mode and the first menu item is being displayed in the selected state in the first menu, the display control unit is configured to control to display the second menu in the state where the second menu item displayed at the first position is displayed in the selected state, and to perform the control (b) in the case where the second operation mode is switched to the first operation mode by the setting unit from said state.

12. The display control apparatus according to claim 1, wherein the plurality of operation modes are respectively different photographing modes, the first operation mode being a first photographing mode, and the second operation mode being a second photographing mode different from the first photographing mode.

* * * * *